United States Patent
Johnson et al.

(10) Patent No.: US 12,128,833 B2
(45) Date of Patent: Oct. 29, 2024

(54) LIGHT ASSEMBLY FOR MOTOR VEHICLE

(71) Applicant: Ford Global Technologies, LLC, Dearborn, MI (US)

(72) Inventors: Aaron B. Johnson, Allen Park, MI (US); Luciano Lukacs, Plymouth, MI (US); Michael L. Merritt, Farmington, MI (US); Joshua Schwab, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 239 days.

(21) Appl. No.: 17/896,139

(22) Filed: Aug. 26, 2022

(65) Prior Publication Data

US 2024/0067107 A1    Feb. 29, 2024

(51) Int. Cl.
| | |
|---|---|
| *B60R 13/00* | (2006.01) |
| *B60K 35/00* | (2024.01) |
| *B60K 35/28* | (2024.01) |
| *B60Q 1/32* | (2006.01) |

(52) U.S. Cl.
CPC ............ *B60R 13/005* (2013.01); *B60K 35/00* (2013.01); *B60Q 1/323* (2013.01); *B60K 35/28* (2024.01); *B60K 2360/169* (2024.01); *B60K 2360/34* (2024.01)

(58) Field of Classification Search
CPC .................................................. B60R 13/005
See application file for complete search history.

(56) References Cited

U.S. PATENT DOCUMENTS

| | | | |
|---|---|---|---|
| 4,600,913 A | 7/1986 | Caine | |
| 5,486,989 A | 1/1996 | Compton | |
| 6,957,132 B1 | 10/2005 | Richburg et al. | |
| 8,944,637 B2 * | 2/2015 | Spiro | |
| 9,604,568 B1 * | 3/2017 | Salter | B60Q 1/247 |
| 10,246,086 B2 * | 4/2019 | Tijerina | B60W 30/06 |
| 10,271,399 B1 * | 4/2019 | Ekladyous | H05B 45/20 |
| 10,336,254 B2 * | 7/2019 | Boesch | G07C 5/00 |
| 10,549,683 B1 * | 2/2020 | Salter | B60Q 1/323 |
| 10,576,879 B1 * | 3/2020 | Salter | B60Q 1/325 |
| 10,754,037 B2 * | 8/2020 | England | B60W 10/04 |
| 10,836,306 B1 * | 11/2020 | Dubey | G09F 13/044 |
| 11,187,396 B1 * | 11/2021 | Johnson | F21S 43/26 |
| 2008/0191626 A1 * | 8/2008 | Salter | H05B 45/20 |
| | | | 315/77 |

(Continued)

FOREIGN PATENT DOCUMENTS

| | | |
|---|---|---|
| EP | 1512575 A2 | 3/2005 |
| JP | 20120387124 A | 2/2012 |
| WO | 2020179577 A1 | 9/2020 |

*Primary Examiner* — Srinivas Sathiraju
(74) *Attorney, Agent, or Firm* — Vichit Chea; Carlson, Gaskey & Olds, P.C.

(57) ABSTRACT

This disclosure relates to a light assembly for a motor vehicle. In some aspects, the techniques described herein relate to a motor vehicle, including: a light assembly including a first section, a second section, a third section, and a fourth section, wherein the first, second, third, and fourth sections are selectively illuminable independent of one another; a conspicuity lamp; and a controller configured to command the light assembly to illuminate at least one of the first, second, third, and fourth sections in phase with the conspicuity lamp.

20 Claims, 4 Drawing Sheets

(56) References Cited

U.S. PATENT DOCUMENTS

| | | | | |
|---|---|---|---|---|
| 2009/0268482 | A1* | 10/2009 | Erlingfors | B62D 25/12 |
| | | | | 362/546 |
| 2012/0280528 | A1* | 11/2012 | Dellock | B60R 13/04 |
| | | | | 362/516 |
| 2014/0022760 | A1 | 1/2014 | Hartwig | |
| 2015/0138794 | A1* | 5/2015 | Salter | B60Q 1/325 |
| | | | | 362/510 |
| 2015/0175060 | A1* | 6/2015 | Salter | B60Q 1/0035 |
| | | | | 362/510 |
| 2015/0226403 | A1* | 8/2015 | Dellock | B60Q 1/26 |
| | | | | 362/510 |
| 2016/0264039 | A1* | 9/2016 | Ekladyous | B60Q 1/1407 |
| 2017/0151903 | A1* | 6/2017 | Salter | B60R 13/005 |
| 2017/0155225 | A1* | 6/2017 | Villeneuve | H01S 3/06754 |
| 2017/0158115 | A1* | 6/2017 | Linden | G08G 1/09626 |
| 2018/0065625 | A1* | 3/2018 | Tijerina | B60W 60/007 |
| 2018/0208185 | A1* | 7/2018 | Nagraj Rao | B60W 30/0956 |
| 2018/0229649 | A1* | 8/2018 | Salter | B60Q 1/486 |
| 2018/0284284 | A1* | 10/2018 | Curatu | G01S 17/89 |
| 2018/0304807 | A1* | 10/2018 | Boesch | G06V 20/584 |
| 2019/0097094 | A1* | 3/2019 | Han | H01L 33/56 |
| 2019/0143879 | A1* | 5/2019 | Krishnan | G01G 19/12 |
| | | | | 362/464 |
| 2019/0202347 | A1* | 7/2019 | Salter | B60Q 1/543 |
| 2019/0236938 | A1* | 8/2019 | Ekladyous | B60Q 1/547 |
| 2019/0275929 | A1* | 9/2019 | Glickman | B60Q 1/2661 |
| 2020/0263846 | A1* | 8/2020 | Miu | F21S 41/25 |
| 2022/0009555 | A1* | 1/2022 | Salter | B60Q 1/38 |
| 2023/0391271 | A1* | 12/2023 | Harmon | B60R 5/02 |
| 2023/0391272 | A1* | 12/2023 | Harmon | H02J 7/0044 |
| 2024/0067107 | A1* | 2/2024 | Johnson | B60Q 1/2607 |

* cited by examiner

LIGHT ASSEMBLY FOR MOTOR VEHICLE

TECHNICAL FIELD

This disclosure relates to a light assembly for a motor vehicle.

BACKGROUND

Motor vehicles are known to include exterior lighting systems including a number of lighting and signaling devices.

SUMMARY

In some aspects, the techniques described herein relate to a motor vehicle, including: a light assembly including a first section, a second section, a third section, and a fourth section, wherein the first, second, third, and fourth sections are selectively illuminable independent of one another; a conspicuity lamp; and a controller configured to command the light assembly to illuminate at least one of the first, second, third, and fourth sections in phase with the conspicuity lamp.

In some aspects, the techniques described herein relate to a motor vehicle, wherein: the conspicuity lamp is a first turn signal configured to selectively illuminate to indicate an intent to turn or merge in a first direction, the motor vehicle further includes a second turn signal configured to selectively illuminate to indicate an intent to turn or merge in a second direction opposite the first direction, when the first turn signal is active, the controller is configured to command the light assembly to periodically illuminate only the two sections of the first, second, third, and fourth sections on a side of the light assembly corresponding to the first direction, and when the second turn signal is active, the controller is configured to command the light assembly to periodically illuminate only the two sections of the first, second, third, and fourth sections on a side of the light assembly corresponding to the second direction.

In some aspects, the techniques described herein relate to a motor vehicle, wherein: the conspicuity lamp is one of the conspicuity lamps that provides four-way flashers of the motor vehicle, and the controller is configured to command the light assembly to periodically illuminate each of the first, second, third, and fourth sections in phase with the four-way flashers.

In some aspects, the techniques described herein relate to a motor vehicle, wherein: the conspicuity lamp is a daytime running lamp, and the controller is configured to command the light assembly to illuminate each of the first, second, third, and fourth sections while the daytime running lamp is activated and at a lower intensity than the daytime running lamp.

In some aspects, the techniques described herein relate to a motor vehicle, wherein the controller is configured to command the light assembly to illuminate each of the first, second, third, and fourth sections in a color different than a color of the daytime running lamp when the motor vehicle is operating in a self-driving mode.

In some aspects, the techniques described herein relate to a motor vehicle, wherein: the controller is configured to command the light assembly to illuminate each of the first, second, third, and fourth sections to illuminate an area adjacent the motor vehicle while the motor vehicle is parked.

In some aspects, the techniques described herein relate to a motor vehicle, wherein: the controller is configured to command the light assembly to illuminate each of the first, second, third, and fourth sections to illuminate in a red color when illuminating the area in low light conditions.

In some aspects, the techniques described herein relate to a motor vehicle, wherein each of the first, second, third, and fourth sections includes an optical, film-based, light emitting diode (LED).

In some aspects, the techniques described herein relate to a motor vehicle, wherein each of the first, second, third, and fourth sections includes a plurality of strips of light emitting diodes (LEDs).

In some aspects, the techniques described herein relate to a motor vehicle, wherein each of the first, second, third, and fourth sections includes includes a lens configured to direct light in a direction away from the vehicle.

In some aspects, the techniques described herein relate to a motor vehicle, wherein each lens includes a long persistent phosphor film.

In some aspects, the techniques described herein relate to a motor vehicle, wherein: the light assembly is mounted to a front of the motor vehicle and faces a forward direction, the first and third sections are on opposite sides of a centerline of the motor vehicle, the first section is vertically above the third section, the second and fourth sections are on opposite sides of the centerline, the first and second sections are vertically aligned, the second section is vertically above the fourth section, the third and fourth sections are vertically aligned, an outer perimeter portion of a housing surrounds the first, second, third, and fourth sections, and a cross-shaped portion of the housing separates the first, second, third, and fourth sections.

In some aspects, the techniques described herein relate to a motor vehicle, including: a light assembly including a first section, a second section, a third section, and a fourth section, wherein the first, second, third, and fourth sections are selectively illuminable independent of one another; and a controller configured to command the light assembly to illuminate at least one of the first, second, third, and fourth sections in proportion to a state of charge of a battery assembly of the motor vehicle.

In some aspects, the techniques described herein relate to a motor vehicle, wherein: the controller is configured to command the light assembly to illuminate each of the first, second, third, and fourth sections when the battery assembly has a state of charge of 100%; the controller is configured to command the light assembly to illuminate only three of the first, second, third, and fourth sections when the battery assembly has a state of charge greater than or equal to 75% but less than 100%; the controller is configured to command the light assembly to illuminate only two of the first, second, third, and fourth sections when the battery assembly has a state of charge greater than or equal to 50% but less than 75%; and the controller is configured to command the light assembly to illuminate only one of the first, second, third, and fourth sections when the battery assembly has a state of charge of greater than or equal to 25% but less than 50%.

In some aspects, the techniques described herein relate to a motor vehicle, wherein the controller is configured to command the light assembly to illuminate none of the first, second, third, and fourth sections when the battery assembly has a state of charge less than 25%.

In some aspects, the techniques described herein relate to a motor vehicle, including: a light assembly including a first section, a second section, a third section, and a fourth section, wherein the first, second, third, and fourth sections are selectively illuminable independent of one another; and a controller configured to command the light assembly to illuminate at least one of the first, second, third, and fourth sections in a custom color or custom sequence selected by a user of the motor vehicle.

In some aspects, the techniques described herein relate to a motor vehicle, wherein, when the controller receives a signal from a sensor indicating the user is present, the controller is configured to command the light assembly to illuminate the first, second, third, and fourth sections in the custom color or custom sequence.

In some aspects, the techniques described herein relate to a motor vehicle, wherein the controller is configured to command the light assembly to vary an intensity of at least one of the first, second, third, and fourth sections in proportion to a proximity of the user to the motor vehicle.

In some aspects, the techniques described herein relate to a motor vehicle, wherein, when a vehicle lock command is received, the controller is configured to command the light assembly to flash each of the first, second, third, and fourth sections three times in succession and on the third flash the controller commands the light assembly to gradually dim each of the first, second, third, and fourth sections until the light assembly is deactivated.

In some aspects, the techniques described herein relate to a motor vehicle, wherein, when a vehicle remote start command is received, the controller is configured to command the light assembly to flash each of the first, second, third, and fourth sections a first color three times in succession and on the third flash the controller commands the light assembly to gradually transition each of the first, second, third, and fourth sections to another color.

DETAILED DESCRIPTION

This disclosure relates to a light assembly for a motor vehicle. Among other benefits, which will be appreciated from the below description, this disclosure provides a customizable exterior light, which is not only aesthetically pleasing but also enhances a user's personal connection with their vehicle. The light assembly can signal various information to those near the motor vehicle, such as representing a state of charge (SOC) of a battery pack of the vehicle. The light assembly is also useable alone or in combination with other conspicuity lamps of the vehicle to provide various signaling and other useful functions.

Figure 1:
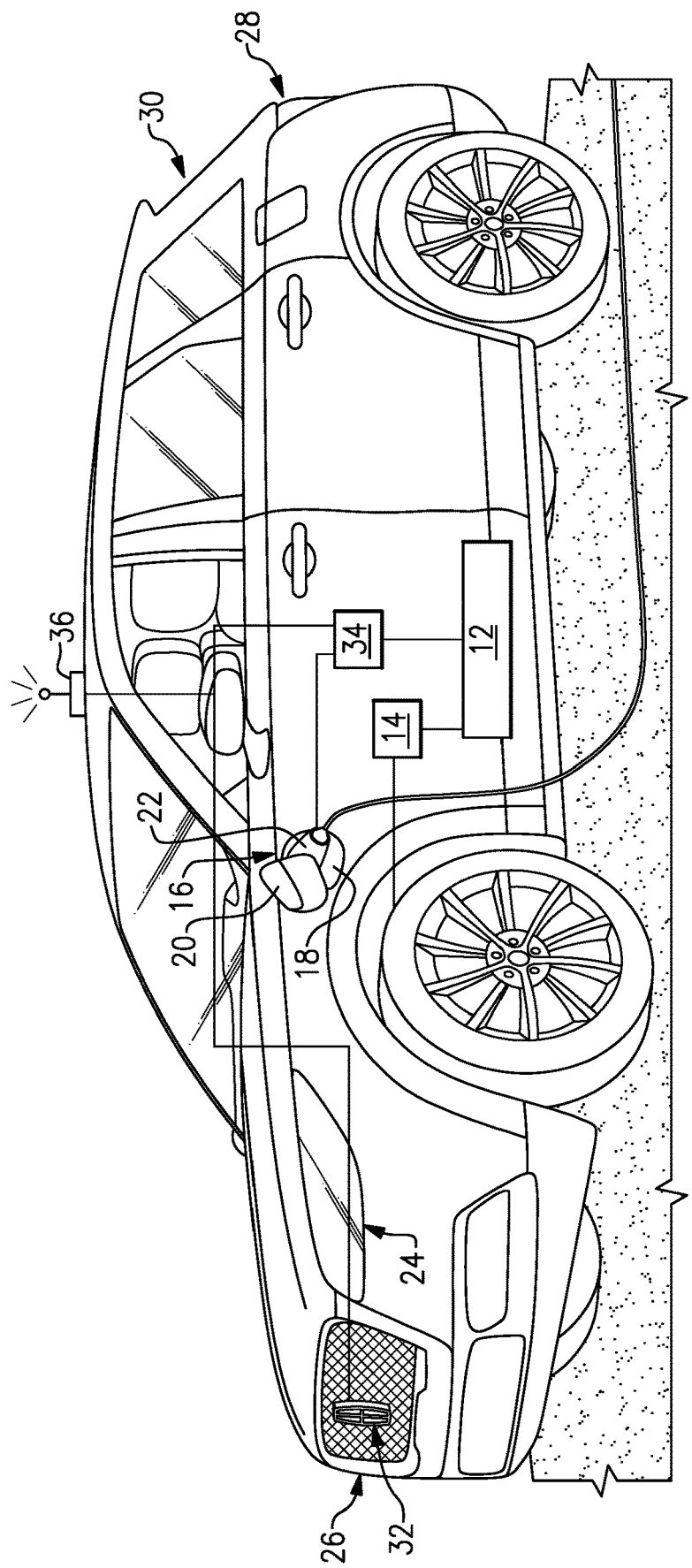
FIG. 1 is a front-perspective view of a motor vehicle with an example light assembly.

FIG. 1 illustrates a motor vehicle 10 ("vehicle 10"). As shown, the vehicle 10 is a sport utility vehicle (SUV). While an SUV is shown, this disclosure extends to other vehicle types, including sedans, trucks, vans, etc.

The vehicle 10, in this example, is an electrified vehicle. Specifically, the vehicle 10 can be a battery electric vehicle (BEV) or a plug-in hybrid electric vehicle (PHEV), and includes a battery pack 12. The battery pack 12 is an energy storage device and, in this example, is an exemplary electrified vehicle battery. The battery pack 12 may be a high voltage traction battery pack that includes a plurality of battery assemblies (i.e., battery arrays or groupings of battery cells) capable of outputting electrical power to operate the electric machine 14, and in turn to propel the vehicle 10, and/or other electrical loads of the vehicle 10. Other types of energy storage devices and/or output devices can also be used to electrically power the vehicle 10. This disclosure is not limited to electrified vehicles.

The vehicle 10 may also include a charging system 16 for periodically charging the cells of the battery pack 12. The charging system 16 may be connected to an external power source, such as an electrical grid, for receiving and distributing power to the cells. In one non-limiting embodiment, the charging system 16 includes a charging port 18 located on-board the vehicle 10. The charging port 18 is adapted to selectively receive power from an external power source, such as from a power cable connected to the external power source, and then distribute the power to the battery pack 12 for charging the cells. The charging port 18 is selectively covered by a charging port door 20. When the charging port door 20 is open, as in FIG. 1, the charging port 18 is configured to couple to plugs, such as plug 22, associated with an electrified vehicle charging station, such as plugs supplying alternating current (AC) power or direct current (DC) power. The charging port 18 may accommodate one or more conventional voltage sources from the external power supply (e.g., 110 volt, 220 volt, etc.).

The vehicle 10 further includes a plurality of conspicuity lamps, including lamp assemblies configured to function as headlamps, turn signals, etc. In this example, the vehicle 10 includes at least four conspicuity lamp assemblies 24, 26, 28, 30. Conspicuity lamp assembly 24 is a front, driver-side (in geographic regions such as North America) lamp assembly configured to operate as a headlamp, turn signal, daytime running lamp, high beam, and a four-way flasher, among other possibilities. The conspicuity lamp assembly 26 is configured structurally and functionally similar to the conspicuity lamp assembly 24, with the exception that the conspicuity lamp assembly 26 is reflected about the centerline of the vehicle 10. The conspicuity lamp assembly 26 provides a front, passenger-side lamp assembly. Conspicuity lamp assembly 28 is a rear, driver-side lamp assembly configured to operate as a tail lamp, brake light, turn signal, and a four-way flasher, among other possibilities. The conspicuity lamp assembly 30 is configured structurally and functionally similar to the conspicuity lamp assembly 28, with the exception that the conspicuity lamp assembly 30 is reflected about the centerline of the vehicle 10 to provide a rear, passenger-side lamp assembly.

The vehicle 10 further includes another light assembly 32. The light assembly 32 is an exterior light assembly configured to selectively emit light visible from an exterior of the vehicle 10. The light assembly 32 is mounted to a front of the vehicle 10 and faces a forward direction such that the light assembly 32 is configured to emit light generally in a forward direction. The light assembly 32 is mounted on the centerline of the vehicle 10. In a particular example, the light assembly 32 is bisected by the centerline of the vehicle 10 and is symmetrical about the centerline. The light assembly 32 is mounted to the grille of the vehicle 10, in this example.

In this example, the light assembly 32 is in communication with a controller 34 and a sensor 36 (either directly or via the controller 34), among other possible structures. The light assembly 32 may be considered to be part of a greater assembly, or sub-assembly of the vehicle 10, that includes the light assembly 32, the controller 34, and the sensor 36, among other structures. Further, the light assembly 32 includes a plurality of selectively illuminable sections responsive to commands from the controller 34. In aspects of this disclosure, the controller 34 receives information, such as information from the battery pack 12, charging port 18, sensor 36, or a user-input including a user activating a turn signal, four-way flasher, etc., and issues commands to the light assembly 32 based on that information.

The controller 34 could be part of an overall vehicle control module, such as a vehicle system controller (VSC), or could alternatively be a stand-alone controller separate from the VSC. Further, the controller 34 may be programmed with executable instructions for interfacing with and operating the various components of the vehicle 10. The controller 34 additionally includes a processing unit and non-transitory memory for executing the various control strategies and modes of the vehicle 10 and light assembly 32.

While only one sensor 36 is shown in FIG. 1, the vehicle 10 could include a plurality of sensors. The sensor 36, and any other sensors, could be pre-existing sensors of the vehicle 10. As examples, the sensor 36 could be a transceiver, receiver, camera (including either still or video cameras), a radar (radio detection and ranging) sensor, a Lidar (light detection and ranging) sensor, etc. The sensor 36 is able to generate signals for performing facial recognition techniques, for detecting a presence of a key fob associated with a user of the vehicle 10, for detecting a presence of a mobile phone associated with a user of the vehicle 10, etc. The sensor 36 can also generate signals indicative of a location of a user, a key fob of a user, or a mobile device of a user relative to the vehicle 10. The controller 34 is able to use the signals from the sensor 36 to determine a trajectory of a user, including whether the user of the vehicle 10 is approaching the vehicle 10 or moving away from the vehicle 10, as examples. The term "user" is used herein to refer to authorized users of the vehicle 10, such as an owner of the vehicle 10 or individuals authorized by the owner of the vehicle 10 to use the vehicle 10, such as family members of the owner. The term "user" also encompasses other authorized users that are not the owner, such as users of the vehicle 10 in rideshare application.

Figure 2:
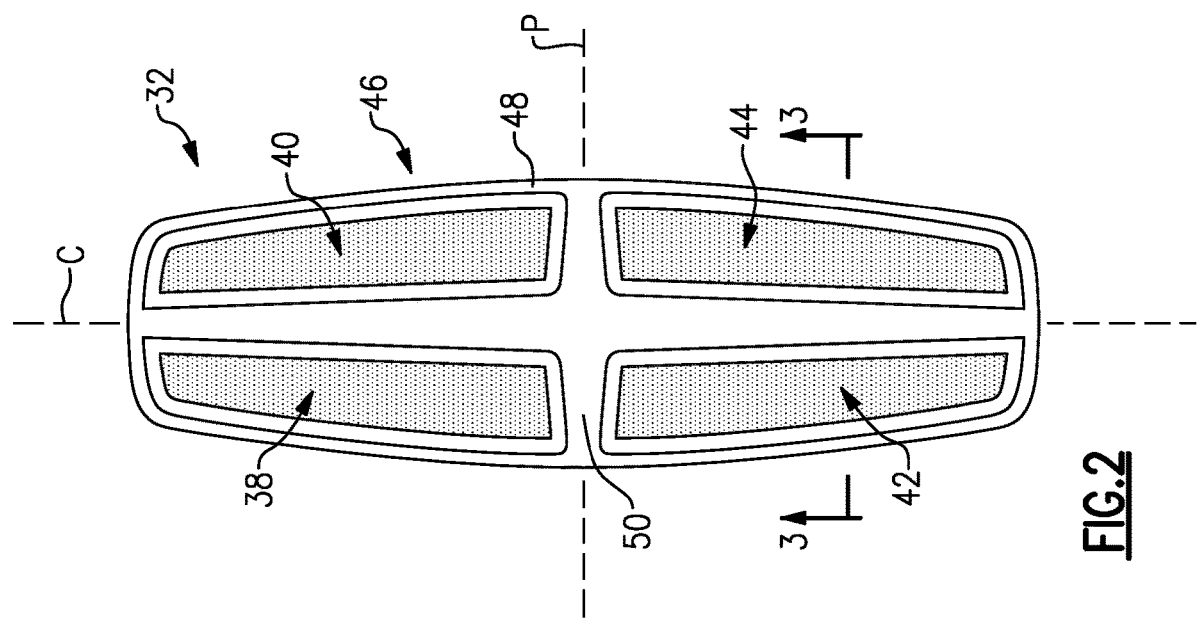
FIG. 2 is a front view of the example light assembly.

FIG. 2 is a front view of the light assembly 32. In this example, the light assembly 32 includes four independently illuminable sections 38, 40, 42, 44. While four sections are shown this disclosure could extend to light assemblies with a different number of sections.

In this example, the sections 38, 40, 42, 44 are configured to selectively illuminate, independently of one another, in response to commands from the controller 34. Further, the sections 38, 40, 42, 44 are configured to selectively illuminate, independently of one another, in one or more sequences and/or colors in response to commands from the controller 34. For example, the controller 34 could command section 38 to illuminate a white color, section 42 to illuminate a green color, while sections 40 and 44 are not illuminated. Various other sequences and colors are contemplated and will be discussed below.

The light assembly 32 includes a housing 46 including an outer perimeter portion 48 surrounding an outside of the sections 38, 40, 42, 44. The housing 46 further includes a cross-shaped portion 50 inward of the outer perimeter portion 48 and separating the sections 38, 40, 42, 44.

Together, the sections 38, 40, 42, 44 and the housing 46 resemble the Lincoln logo, which is an iconic logo associated with the Lincoln Motor Company, which is a division of Ford Motor Company. This disclosure is not limited to light assemblies that resemble the Lincoln logo or any other logo. That said, when the light assembly 32 is configured to resemble the logo, the light assembly 32 serves as a logo and the vehicle 10 does not require another logo on the front of the vehicle 10.

In this example, as shown, each of the individual sections 38, 40, 42, 44 exhibits substantially the same shape and surface area. In particular, sections 38 and 40 are on opposite sides of the centerline C of the vehicle 10. Section 38 is substantially the same size and shape as section 40, but reflected about the centerline C. The centerline C is also representative of the centerline of the light assembly 32. Sections 38 and 40 are likewise the same size and shape as sections 42, 44, reflected about a plane P passing through the center of the light assembly 32 in a direction perpendicular to the centerline C. The section 38 is directly vertically above section 42, and section 40 is directly vertically above section 44.

Sections 38, 40 are vertically aligned with one another and arranged above the plane P, while sections 42, 44 are vertically aligned with one another and arranged below the plane P. Sections 38, 42 are laterally aligned on a common side (i.e., the passenger side) of the centerline C, and sections 40, 42 are laterally aligned on a common side (i.e., the driver side) of the centerline C. The sections 38, 40, 42, 44 may be considered to provide the light assembly 32 with selectively illuminable quadrants, with the quadrants generally separated by the centerline C and plane P.

Figure 3:
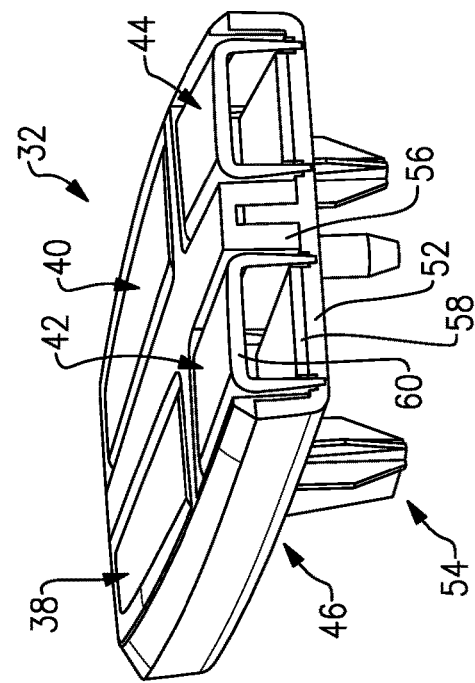
FIG. 3 is a cross-sectional view taken along line 3-3 from FIG. 2, and illustrates additional detail of the example light assembly.

FIG. 3 is a cross-sectional view taken along line 3-3 from FIG. 2, and illustrates additional detail of one embodiment of the light assembly 32. In an example, the housing 46 includes a base 52 having a plurality of connectors 54 projecting therefrom in a direction opposite the sections 38, 40, 42, 44. The connectors 54 facilitate connection of the housing 46, and in turn the light assembly 32, to the vehicle 10. The connectors 54 may mechanically and electrically connect the light assembly 32 to the remainder of the vehicle 10.

The housing 46 is made of an opaque material in one example. Further, the housing 46 may be a two-piece housing. As shown, the housing 46 includes a cover 56 connected to the base 52, such as by a snap-fit, adhesive, or welded connection.

Each section 38, 40, 42, 44 includes its own lens and light source in this example. Specifically, with reference to section 42, a light source 58 is mounted to the base 52. The light source 58 is covered by a lens 60. The lens 60 projects upward from the base 52 and substantially fills the space between the outer perimeter portion 48 and the cross-shaped portion 50 of the housing 46 that is associated with the section 42. While only one light source is shown within the section 42, each section could include additional light sources. The arrangement of the section 42 is representative of the arrangement of the remaining sections 38, 40, 44.

The lens 60 is configured to direct light emitted from the light source 58 outward such that the light is visible from an exterior of the vehicle 10. Further, the lens 60 is attached to the housing 46 in a manner that seals the light source 58 from the environment. The lens 60 may be made entirely or partially of transparent material to provide a desired lighting pattern. The lens 60 may be made of a clear material or a colored material to provide a desired color. The lens 60 may be partially opaque to provide a desired lighting effect in some examples. Alternatively or additionally, the lens 60 may include surface features such as etchings or projections to provide a desired lighting effect in some examples. In an aspect of this embodiment, a surface of the lens 60 can be coated with a long persistent phosphor film such that the lens 60 glows following deactivation of the light source 58. Each section 38, 40, 42, 44 may include a similarly-configured lens or different lenses.

The light source 58 in this embodiment is an optical, film-based, light emitting diode (LED), which is substantially planar and fills substantially the entirety of the section 42. The film-based LED is supported by the base 52. In one example, the film-based LED is provided by Nexlide-E, which is offered commercially by LG Innotek. The film-based LED is selectively illuminable in response to commands from the controller 34. The film-based LED is capable of illuminating in a plurality of different colors, in a plurality of different sequences, and at variable intensities, as commanded by the controller 34.

Alternatively, the light source 58 could be provided as a printed circuit board (PCB) LED. In that example, the light source 58 could include one or more strips of LEDs, which are mounted to a PCB, which in turn is mounted to base 52. The PCB may be in communication with each of the LEDs within the strips of LEDs, and may also be in communication with, or considered part of, the controller 34. Each strip of LEDs may include a plurality of spaced-apart LEDs along its length. Each strip of LEDs may be provided by Luxeon XF-3014 CV flexible LED strips offered commercially by Lumileds, as one example. In addition, the light source 58 could be provided by organic light-emitting diodes (OLEDs) or by a laser light source.

Example control strategies for illuminating the light assembly 32 will now be described. The control strategies are executed by the light assembly 32, in response to commands from the controller 34, which responds to various inputs and/or information, as described herein.

In this disclosure, reference to activating or illuminating the light assembly 32 refers to illuminating or activating one or more of the light sources associated with the sections 38, 40, 42, 44, such as light source 58. Deactivating the light assembly 32 means each of the sections 38, 40, 42, 44 are deactivated and not emitting light. Deactivating one of the sections 38, 40, 42, 44 means that only those particular sections are not emitting light.

Figure 4:
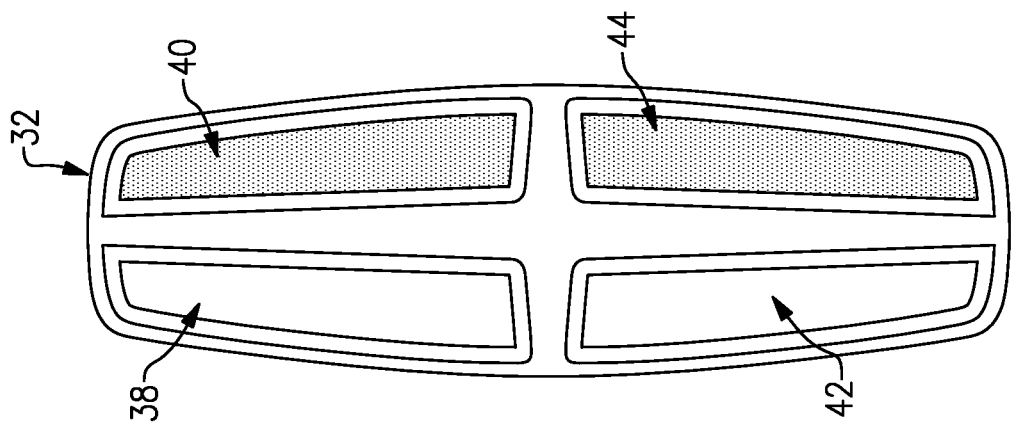
FIG. 4 is representative of an exemplary manner in which the light assembly is illuminated when a right-turn signal is active.
Figure 5:
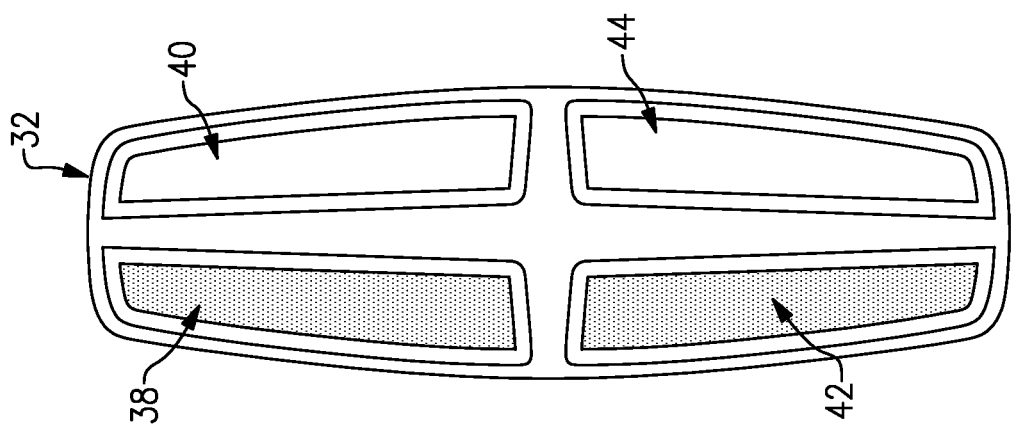
FIG. 5 is representative of an exemplary manner in which the light assembly is illuminated when a left-turn signal is active.

In one aspect of this disclosure, the controller 34 is configured to command the light assembly 32 to illuminate one or more of sections 38, 40, 42, 44 in phase with a conspicuity lamp. In particular, the light assembly 32 is configured to illuminate in phase with turn signals, which indicate an intention of the vehicle 10, via a driver and/or a self-driving system, to turn or merge in a particular direction. As one example, represented by FIG. 4, when the conspicuity lamp assemblies 26, 30 are activated and functioning as right turn signals, the controller 34 commands sections 38, 42, which are on the same side of the vehicle 10 as the right turn signals, to illuminate in phase with the right turn signal. The sections 38, 42 may illuminate in a color corresponding to a turn signal lamp, such as an amber color. FIG. 5 is representative of the controller 34 commanding the sections 40, 44 to illuminate in phase with a left turn signal.

In another aspect, when the conspicuity lamp assemblies 24, 26, 28, 30 are functioning as four-way flashers, the controller 34 is configured to command the light assembly to periodically illuminate each of sections 38, 40, 42, 44 in phase with the four-way flashers. Further, the controller 34 is configured to illuminate the sections 38, 40, 42, 44 in a same color as the four-way flashers, such as an amber color.

In another aspect, when one or more of the conspicuity lamp assemblies 24, 26, 28, 30 are functioning as daytime running lamps, the controller is configured to command the light assembly 32 to illuminate each of the sections 38, 40, 42, 44 while the daytime running lamps are activated. In a particular example, the controller 34 commands the sections 38, 40, 42, 44 to illuminate at a lower intensity than the daytime running lamps.

In yet another aspect, the controller 34 is configured to command the light assembly 32 to illuminate each of the sections 38, 40, 42, 44 to illuminate an area adjacent the vehicle 10 while the vehicle 10 is parked. Here, the term parked includes conditions in which the vehicle 10 is stopped, regardless of whether the vehicle 10 is shifted into park. This aspect facilitates illumination of an area, such as a work area, in front of the vehicle 10 in low light conditions, such as at night. Further, the controller 34 may be configured to command the light assembly 32 to illuminate each of the sections 38, 40, 42, 44 to illuminate in a red color, which may reduce glare in low light conditions.

In another aspect, the controller 34 is configured to command the light assembly 32 to illuminate the sections 38, 40, 42, 44 in a color different than a color of a daytime running lamp when the vehicle 10 is operating in a self-driving mode. In this way, those on an exterior of the vehicle 10 can identify the vehicle 10 as one that is being driven by a self-driving system.

In another aspect of this disclosure, the controller 34 is configured to illuminate the light assembly 32 to indicate a state of charge (SOC) of the battery pack 12. Specifically, the controller 34 is configured to command the light assembly 32 to illuminate one or more of the sections 38, 40, 42, 44 in proportion to the SOC of the battery pack 12.

Figure 6:
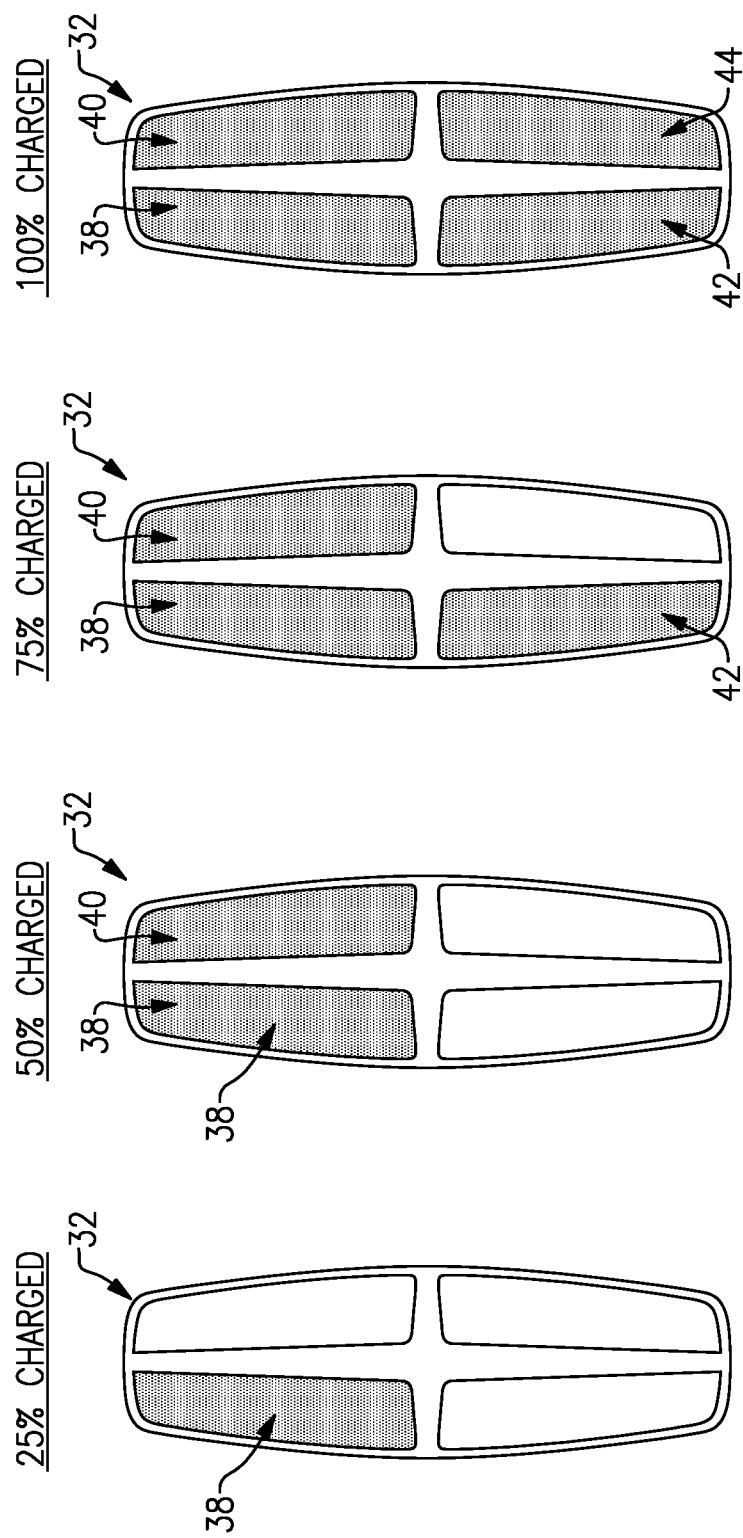
FIG. 6 is representative of an exemplary manner in which the light assembly is illuminated to indicate various states of charge of a battery pack of the motor vehicle.

In a particular example, as shown in FIG. 6, the controller 34 is configured to gradually illuminate more of the sections 38, 40, 42, 44 as the SOC of the battery pack 12 increases. For example, the controller is configured to command the light assembly 32 to illuminate only one of the sections 38, 40, 42, 44, which here is the section 38, when the battery pack 12 has an SOC of greater than or equal to 25% but less than 50%. The controller 34 is configured to command the light assembly 32 to illuminate only two of the sections 38, 40, 42, 44, which here are sections 38, 40, when the battery pack 12 has an SOC greater than or equal to a 50% but less than a 75%. Further, the controller 34 is configured to command the light assembly 32 to illuminate only three of the sections 38, 40, 42, 44, which here are the sections 38, 40, and 42, when the battery pack 12 has an SOC of greater than or equal to 75% but less than 100%. Finally, each of the sections 38, 40, 42, 44 are illuminated when the battery pack 12 has an SOC of 100%.

When the SOC of the battery pack 12 falls below 25%, none of the sections 38, 40, 42, 44 are illuminated. The controller 34 may command the sections 38, 40, 42, 44 to flash a red color, in an example, indicating the battery pack 12 has a low SOC.

The controller 34 may illuminate the sections 38, 40, 42, 44 in a green color when the vehicle 10 is on-plug, meaning when the vehicle 10 has a plug in the charging port 18, as in FIG. 1. The sections 38, 40, 42, 44 may flash periodically when charging is occurring and illuminate in a steady state when charging is not occurring, such as when 100% SOC is reached. Representing the SOC of the battery pack 12 via the light assembly 32 allows a user to readily and intuitively view an approximate SOC of the battery pack 12 from an exterior of the vehicle 10.

While a particular manner for illuminating the sections 38, 40, 42, 44 to indicate the SOC of the battery pack 12 has been discussed, the controller 34 could command the sections 38, 40, 42, 44 to illuminate in another manner to represent the SOC of the battery pack 12. For instance, the sections 38, 40, 42, 44 could gradually illuminate in a clockwise or counter-clockwise direction. Alternatively, the sections 38, 40, 42, 44 could gradually illuminate in a vertical direction, beginning with low SOC values by partially illuminating bottom portions of sections 42, 44 and gradually illuminating the surface area of the sections 38, 40, 42, 44 moving in the upward direction with increasing SOC values. In other words, the sections 38, 40, 42, 44 could illuminate from the bottom up. As an example, at an SOC of 25%, the bottom half of sections 42, 44 would be illuminated, at 50% SOC the entirety of sections 42, 44 would be illuminated, at 75% SOC the entirety of sections 42, 44 and the bottom half of sections 38, 40 would be illuminated, and at 100% SOC all four sections 38, 40, 42, 44 would be fully illuminated. The sections 38, 40, 42, 44 could be partially illuminable in this embodiment. The lenses could include chambers to permit a user to readily view the partial illumination.

In another aspect, the controller 34 is configured to illuminate one or more of the sections 38, 40, 42, 44 in custom colors and/or in a custom sequence, as selected by the user. The custom colors and/or sequence may be initiated in response to a signal from the sensor 36, such as a signal indicative of a presence of a user of the vehicle 10.

In a first example function, the light assembly 32 is configured to illuminate when one or more signals from the sensor 36 indicate a user, which again may include the owner of the vehicle 10 and/or authorized users, is present. Specifically, when the vehicle 10 is off and the light assembly 32 is not illuminated, the light assembly 32 remains powered and such that the sensor 36 can generate a signal indicative of a user being present within a threshold distance of the vehicle 10. The signal may be based on a face of the user being recognized using a facial recognition technique, a key fob of the user being identified, or a mobile device of the user is identified, as examples. The signal may indicate a distance between the user and the vehicle 10, and the controller 34 can determine whether the user is approaching the vehicle 10 and/or within a threshold distance such that the light assembly 32 should be activated.

In response to the signal, the controller 34 is configured to command the light assembly 32 to illuminate, which serves as a "welcome" or "wake up" light to the user. In particular, the controller 34 can command the light assembly 32 to illuminate without requiring the user to press an "unlock" or other button on a key fob, for example. Rather, the "welcome" light is activated entirely passively by the vehicle 10 without requiring an input by the user.

The user can customize the "welcome" light, including selecting a custom color for the light assembly 32 to illuminate and/or selecting a custom light sequence. For instance, the user could select a sequence in which the sections 38, 40, 42, 44 illuminate an amber light color that gradually fades on as their "welcome" light. As another example, the user could select a sequence in which each of the sections 38, 40, 42, 44 illuminates a green light color that flashes three times in succession and remains on following the third flash. As yet another example, the user could select a light pattern that involves illuminating the sections 38, 40, 42, 44 in various colors at once, such as two sections that are blue and two sections that are red. Other example welcome light colors and sequences come within this disclosure. The user selections may be made using a human-machine interface of the vehicle 10, such as the vehicle infotainment system, or via a software application running on a mobile device of the user.

As another example of a "welcome" light, the controller 34 can command the sections 38, 40, 42, 44 to emit light at a gradually increasing intensity as the user approaches the vehicle 10. In this way, the intensity of light increases in proportion to a proximity of the user to the vehicle 10. In other words, the light grows brighter as the user approaches the vehicle 10.

The controller 34 can also command the light assembly 32 to function as a "farewell" light by illuminating in a custom color and/or sequence, selected by a user, when a user is departing the vehicle 10. As one example of a "farewell" light, the light intensity of the sections 38, 40, 42, 44 can gradually decrease as the user moves further from the vehicle 10.

Other example functions relate to the reaction of the light assembly 32 to various user inputs. In one example function, when a vehicle lock command is received, by the sensor 36 for example, the controller 34 is configured to command each of the sections 38, 40, 42, 44 to flash three times, in a color such as white, in succession and on the third flash the controller 34 commands the light assembly 32 to gradually dim each of the sections 38, 40, 42, 44 until the light assembly 32 is deactivated. Another example function includes when a vehicle remote start command is received, again by the sensor 36 for example, the controller 34 is configured to command each of the sections 38, 40, 42, 44 to flash a first color, such as an amber color, three times in succession and on the third flash the controller 34 commands the light assembly 32 to remain illuminated while gradually transitioning each of the sections 38, 40, 42, 44 to another color, such as white. Other example reactions to user inputs come within the scope of this disclosure.

It should be understood that terms such as "about," "substantially," and "generally" are not intended to be boundaryless terms, and should be interpreted consistent with the way one skilled in the art would interpret those terms. Further, directional terms such as "forward," "rearward," "upward," "downward," "vertical," "horizontal," etc., are used for purposes of explanation only and should not otherwise be construed as limiting.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A motor vehicle, comprising:
 a light assembly including a first section, a second section, a third section, and a fourth section, wherein the first, second, third, and fourth sections are selectively illuminable independent of one another, wherein the light assembly includes a housing, wherein an outer perimeter of the housing surrounds each of the first, second, third, and fourth sections;
a conspicuity lamp; and
a controller configured to command the light assembly to illuminate at least one of the first, second, third, and fourth sections in phase with the conspicuity lamp.

2. The motor vehicle as recited in claim 1, wherein:
the conspicuity lamp is a first turn signal configured to selectively illuminate to indicate an intent to turn or merge in a first direction,
the motor vehicle further comprises a second turn signal configured to selectively illuminate to indicate an intent to turn or merge in a second direction opposite the first direction,
when the first turn signal is active, the controller is configured to command the light assembly to periodically illuminate only the two sections of the first, second, third, and fourth sections on a side of the light assembly corresponding to the first direction, and
when the second turn signal is active, the controller is configured to command the light assembly to periodically illuminate only the two sections of the first, second, third, and fourth sections on a side of the light assembly corresponding to the second direction.

3. The motor vehicle as recited in claim 1, wherein:
the conspicuity lamp is one of the conspicuity lamps that provides four-way flashers of the motor vehicle, and
the controller is configured to command the light assembly to periodically illuminate each of the first, second, third, and fourth sections in phase with the four-way flashers.

4. The motor vehicle as recited in claim 1, wherein:
the conspicuity lamp is a daytime running lamp, and
the controller is configured to command the light assembly to illuminate each of the first, second, third, and fourth sections while the daytime running lamp is activated and at a lower intensity than the daytime running lamp.

5. The motor vehicle as recited in claim 4, wherein the controller is configured to command the light assembly to illuminate each of the first, second, third, and fourth sections in a color different than a color of the daytime running lamp when the motor vehicle is operating in a self-driving mode.

6. The motor vehicle as recited in claim 1, wherein:
the controller is configured to command the light assembly to illuminate each of the first, second, third, and fourth sections to illuminate an area adjacent the motor vehicle while the motor vehicle is parked.

7. The motor vehicle as recited in claim 6, wherein:
the controller is configured to command the light assembly to illuminate each of the first, second, third, and fourth sections to illuminate in a red color when illuminating the area in low light conditions.

8. The motor vehicle as recited in claim 1, wherein each of the first, second, third, and fourth sections includes an optical, film-based, light emitting diode (LED).

9. The motor vehicle as recited in claim 1, wherein each of the first, second, third, and fourth sections includes a plurality of strips of light emitting diodes (LEDs).

10. The motor vehicle as recited in claim 1, wherein each of the first, second, third, and fourth sections includes comprises a lens configured to direct light in a direction away from the vehicle.

11. The motor vehicle as recited in claim 10, wherein each lens includes a long persistent phosphor film.

12. The motor vehicle as recited in claim 1, wherein:
the light assembly is mounted to a front of the motor vehicle and faces a forward direction,
the first and third sections are on opposite sides of a centerline of the motor vehicle,
the first section is vertically above the third section,
the second and fourth sections are on opposite sides of the centerline,
the first and second sections are vertically aligned,
the second section is vertically above the fourth section,
the third and fourth sections are vertically aligned, and
a cross-shaped portion is within the outer perimeter of the housing and separates the first, second, third, and fourth sections.

13. A motor vehicle, comprising:
a light assembly including a first section, a second section, a third section, and a fourth section, wherein the first, second, third, and fourth sections are selectively illuminable independent of one another; and
a controller configured to command the light assembly to illuminate at least one of the first, second, third, and fourth sections in proportion to a state of charge of a battery assembly of the motor vehicle.

14. The motor vehicle as recited in claim 13, wherein:
the controller is configured to command the light assembly to illuminate each of the first, second, third, and fourth sections when the battery assembly has a state of charge of 100%,
the controller is configured to command the light assembly to illuminate only three of the first, second, third, and fourth sections when the battery assembly has a state of charge greater than or equal to 75% but less than 100%,
the controller is configured to command the light assembly to illuminate only two of the first, second, third, and fourth sections when the battery assembly has a state of charge greater than or equal to 50% but less than 75%, and
the controller is configured to command the light assembly to illuminate only one of the first, second, third, and fourth sections when the battery assembly has a state of charge of greater than or equal to 25% but less than 50%.

15. The motor vehicle as recited in claim 14, wherein the controller is configured to command the light assembly to illuminate none of the first, second, third, and fourth sections when the battery assembly has a state of charge less than 25%.

16. A motor vehicle, comprising:
a light assembly including a first section, a second section, a third section, and a fourth section, wherein the first, second, third, and fourth sections are selectively illuminable independent of one another, wherein the light assembly includes a housing, wherein an outer perimeter of the housing surrounds each of the first, second, third, and fourth sections; and
a controller configured to command the light assembly to illuminate at least one of the first, second, third, and fourth sections in a custom color or custom sequence selected by a user of the motor vehicle.

17. The motor vehicle as recited in claim 16, wherein, when the controller receives a signal from a sensor indicating the user is present, the controller is configured to command the light assembly to illuminate the first, second, third, and fourth sections in the custom color or custom sequence.

18. The motor vehicle as recited in claim 17, wherein the controller is configured to command the light assembly to vary an intensity of at least one of the first, second, third, and fourth sections in proportion to a proximity of the user to the motor vehicle.

19. The motor vehicle as recited in claim 16, wherein, when a vehicle lock command is received, the controller is configured to command the light assembly to flash each of the first, second, third, and fourth sections three times in succession and on the third flash the controller commands the light assembly to gradually dim each of the first, second, third, and fourth sections until the light assembly is deactivated.

20. The motor vehicle as recited in claim 16, wherein, when a vehicle remote start command is received, the controller is configured to command the light assembly to flash each of the first, second, third, and fourth sections a first color three times in succession and on the third flash the controller commands the light assembly to gradually transition each of the first, second, third, and fourth sections to another color.

* * * * *